United States Patent
Bowman et al.

(10) Patent No.: US 12,274,272 B1
(45) Date of Patent: Apr. 15, 2025

(54) FUNCTIONALIZED NON-DAIRY BASE AND METHOD FOR PRODUCING NON-DAIRY ANALOGS

(71) Applicant: Eclipse Foods Co., Oakland, CA (US)

(72) Inventors: Thomas Bowman, Oakland, CA (US); Aylon Steinhart, Oakland, CA (US)

(73) Assignee: Eclipse Foods Co., Oakland, CA (US)

( * ) Notice: Subject to any disclaimer, the term of this patent is extended or adjusted under 35 U.S.C. 154(b) by 611 days.

(21) Appl. No.: 16/820,502

(22) Filed: Mar. 16, 2020

Related U.S. Application Data (60) Provisional application No. 62/874,885, filed on Jul. 16, 2019, provisional application No. 62/819,431, filed on Mar. 15, 2019.

(51) Int. Cl.
| | | |
|---|---|---|
| *A23C 11/06* | (2006.01) | |
| *A23C 20/02* | (2021.01) | |
| *A23G 9/32* | (2006.01) | |
| *A23G 9/34* | (2006.01) | |
| *A23G 9/38* | (2006.01) | |
| *A23G 9/42* | (2006.01) | |

(52) U.S. Cl.
CPC ............. *A23C 11/06* (2013.01); *A23C 20/02* (2013.01); *A23G 9/327* (2013.01); *A23G 9/34* (2013.01); *A23G 9/38* (2013.01); *A23G 9/42* (2013.01)

(58) Field of Classification Search
CPC ............ A23G 9/34; A23G 9/38; A23G 9/327; A23G 9/42; A23C 20/02; A23C 11/06
See application file for complete search history.

(56) References Cited

U.S. PATENT DOCUMENTS

| | | | | |
|---|---|---|---|---|
| 4,208,323 A | * | 6/1980 | Murray | A21D 2/26 426/656 |
| 5,614,245 A | * | 3/1997 | Gupta | A23D 7/0056 426/601 |
| 2006/0127560 A1 | * | 6/2006 | Back | A61K 36/48 426/656 |
| 2012/0135125 A1 | * | 5/2012 | Muschiolik | A23L 33/185 426/602 |

(Continued)

OTHER PUBLICATIONS

Dairy for Global Nutrition "Nutritional Composition of Skim Milk Powder". Available from Reference Manual for U.S. Milk Powders, Arlington, VA, US Dairy Council, 2005, p. 41. (Year: 2005).*

(Continued)

*Primary Examiner* — Jenna A Watts
(74) *Attorney, Agent, or Firm* — Run8 Patent Group, LLC; Peter Miller; Leah Raddatz (57) ABSTRACT

A method for generating a non-dairy base mixture includes: treating a volume of water with a first set of ingredients soluble in the volume of water to form a first mixture; mixing a second set of ingredients at a first speed for a first duration into the first mixture to form a second mixture, the second set of ingredients including a protein-starch blend; hydrating the second set of ingredients in the second mixture with no shear; adding a third set of ingredients to the second mixture in a standard sequence to form a third mixture; pasteurizing the third mixture, within a first temperature range; blending an oil into the third mixture at a set rate, the third mixture within a second temperature range, to form an emulsion; and, homogenizing the emulsion, within a second temperature range, and over a second duration, to form a base mixture.

20 Claims, 3 Drawing Sheets

(56) References Cited

U.S. PATENT DOCUMENTS

2015/0104556 A1* 4/2015 Kumar ............... A23C 13/125
426/565
2015/0366233 A1 12/2015 Brown et al.
2016/0309732 A1* 10/2016 Gugger ............... A23L 27/60

OTHER PUBLICATIONS

Damodaran, ed. "Food Proteins and Lipids". "Solubilization of Oil Droplets by Micellar Surfactant Solutions", by McClements. Advances in Experimental Medicine and Biology, vol. 415. 1997, Springer Science and Business Media, New York. P (Year: 1997).*

Mullan, "Perfect Ice Cream or Gelato: Getting the hardness or scoopability just right". Available online as of 2013 from https://www.dairyscience.info. pp. 1-18. (Year: 2013).*

Nierenberg, "The Science of Cooking Oils: Which are really the healthiest?". Available online as of Jul. 21, 2017 from https://www.livescience.com. pp. 1-19. (Year: 2017).*

Baker, Steven. "Maximizing the use of food emulsifiers". A Report submitted in partial fulfillment of the requirements for the degree of Masters in Science, Food Science, Kansas State University. 2010. pp. 1-79. (Year: 2010).*

Ismond, et al. "Chapter 7: Formation and Interaction of Plant Protein Micelles in Food Systems". Parris and Barford; Interactions of Food Proteins, ACS Symposium Series, ACS, 1991. pp. 91-103. (Year: 1991).*

"Applications and Uses of L Proline". Available online as of Jul. 6, 2015 from www.foodsweeteners.com. pp. 1-10. (Year: 2015).*

"The Casein Family—Science of Cheese Proteins". Available online as of May 11, 2017 from Foodcrumbles.com. pp. 1-13. (Year: 2017).*

* cited by examiner

FUNCTIONALIZED NON-DAIRY BASE AND METHOD FOR PRODUCING NON-DAIRY ANALOGS

CROSS-REFERENCE TO RELATED APPLICATIONS

This application claims the benefit of U.S. Provisional Application No. 62/874,885, filed on 16 Jul. 2019, and U.S. Provisional Application No. 62/819,431, filed on 15 Mar. 2019, each of which is incorporated in its entirety by this reference.

TECHNICAL FIELD

This invention relates generally to the field of food science and more specifically to a new and useful functionalized non-dairy base and method for producing non-dairy analogs in the field of food processing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Base Mixture—Composition

Figure 1:
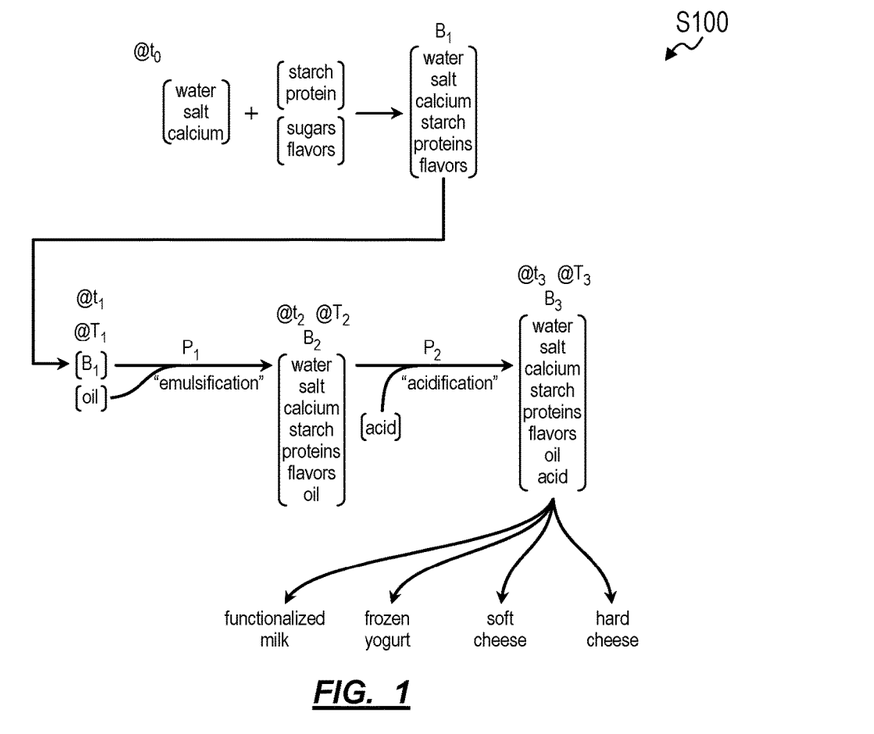
FIG. 1 is a flowchart representation of a method.
Figure 3A:
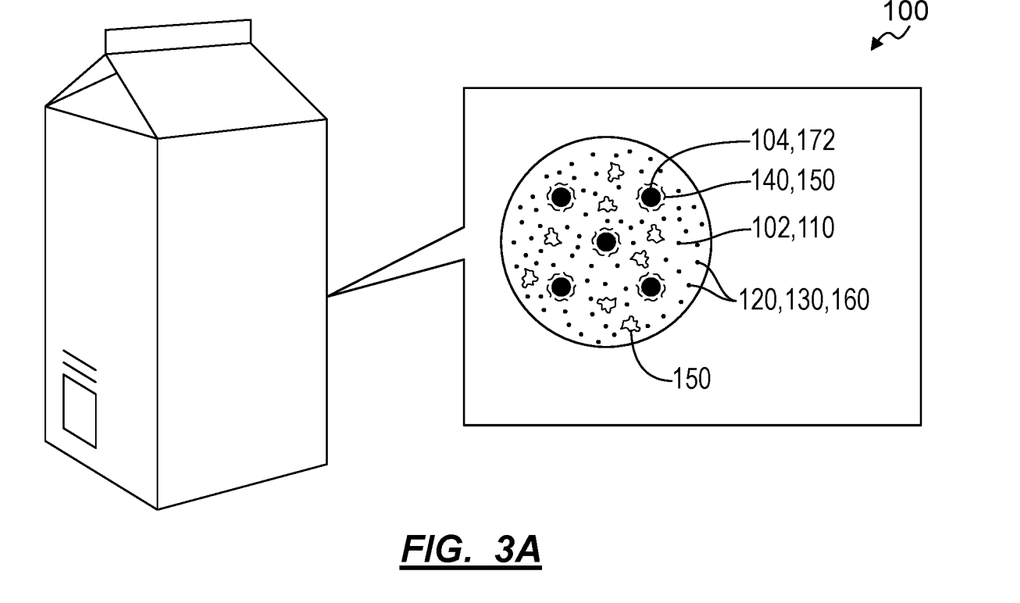
FIGS. 3A and 3B are schematic representations of a composition.
Figure 3B:
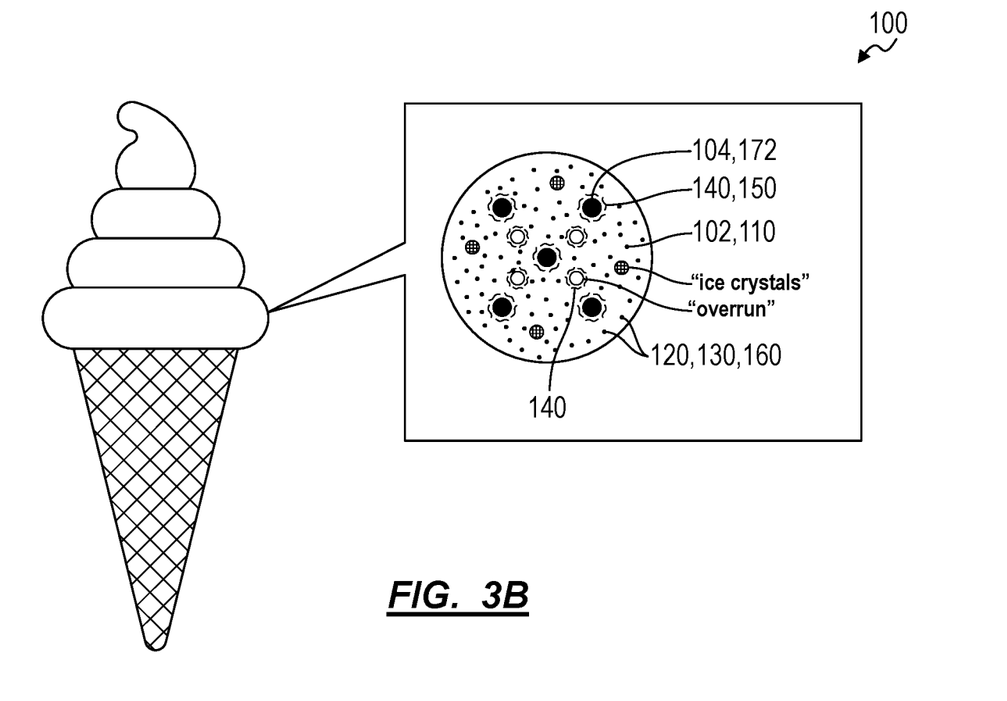

As shown in FIGS. 1, 3A and 3B, a volume of a base mixture 100 includes an aqueous phase 102 including: a proportion of water 110; a proportion of salt 120 dissolved in the proportion of water 110 and configured to solubilize proteins in the aqueous phase 102; a proportion of calcium 130 dissolved in the proportion of water 110; a proportion of proteins 140 configured to form a barrier between the aqueous phase 102 and oil droplets 172 of an oil phase 104; a proportion of starches 150 configured to stabilize the aqueous phase 102 and the oil phase 104; and a proportion of sweeteners 160. The volume of the base mixture 100 further includes the oil phase 104 defining a volume of oil droplets 172 dispersed throughout the aqueous phase 102, immiscible in the aqueous phase 102, and configured to form an emulsion with the aqueous phase 102.

One variation of the base mixture 100 includes: a first proportion of water 110 forming an aqueous phase 102; a first proportion of salt 120 dissolved in the aqueous phase 102; a first proportion of calcium 130 dissolved in the aqueous phase 102; a first proportion of sweeteners 160 dissolved in the aqueous phase 102; a first proportion of fats 170 forming an oil phase 104 and configured to form oil droplets 172 dispersed throughout the aqueous phase 102. The base mixture 100 further includes a first proportion of a protein-starch blend 145 including a first proportion of proteins 140 and a first proportion of starches 150, and configured to: absorb water in the aqueous phase 102; form an interface between the aqueous phase 102 and oil droplets 172 of the oil phase 104 to form an emulsion; and form micelles responsive to acidification of the emulsion. The base mixture 100 further includes a second proportion of starches configured to absorb water from the first proportion of water 110 and stabilize the aqueous phase 102 in the emulsion.

In another variation, the volume of the base mixture 100 includes an aqueous phase 102 including: a proportion of water 110; a proportion of salt 120 dissolved in the proportion of water 110; a proportion of calcium 130 dissolved in the proportion of water 110; a proportion of proteins hydrated by the proportion of water 110 and configured to interact with the proportion of calcium 130 to form micelles; a proportion of starches hydrated by the proportion of water 110; and a proportion of sweeteners. The volume of the base mixture 100 further includes an oil phase 104: including a proportion of fats; immiscible in the aqueous phase 102; and configured to interact with a subset of the proportion of proteins and a subset of the proportion of starches to form an emulsion with the aqueous phase 102.

In one variation, the base mixture 100 further includes: a proportion of a buffer configured to raise a pH of the base mixture 100; and a proportion of an amino acid configured to counter desiccation of the base mixture 100 generated by the proportion of proteins.

2. Method

As shown in FIG. 1, a method S100 for generating a non-dairy base mixture 100 includes: treating a volume of water 110 with a first set of ingredients to form a first mixture in Block S110, the first set of ingredients including salt and soluble in the volume of water 110; mixing a second set of ingredients at a first speed for a first duration into the first mixture to form a second mixture in Block S120, the second set of ingredients including a protein-starch blend; adding a third set of ingredients to the second mixture to form a third mixture in Block S130, the third set of ingredients including sweeteners; pasteurizing the third mixture within a first temperature range and for a second duration in Block S140; blending an oil into the third mixture, regulated within a second temperature range, to form an emulsion including a dispersion of oil droplets 172 within the volume of water 110 in Block S150; homogenizing the emulsion, regulated within a third temperature range, over a third duration to form a base mixture 100 in Block S160; and cooling the base mixture 100 from within the third temperature range to within a fourth temperature range in Block S170.

In one variation, the method further includes: adding an acid to the third mixture, prior to blending the oil into the third mixture, to promote micelle formation between proteins, starches, and the dispersion of oil droplets 172 in the base mixture 100 in Block S180.

In one variation, the method S100 further includes: hydrating the second set of ingredients in the second mixture without shear for a fourth duration; adding a fourth set of ingredients to the third mixture in Block S142, the fourth set of ingredients including a proportion of a buffer configured to raise a pH level of the third mixture and a proportion of an amino acid configured to neutralize tannins present in the second set of ingredients; and storing the base mixture 100 in a chilled environment to inhibit reactions between the second set of ingredients.

3. Applications

Figure 2A:
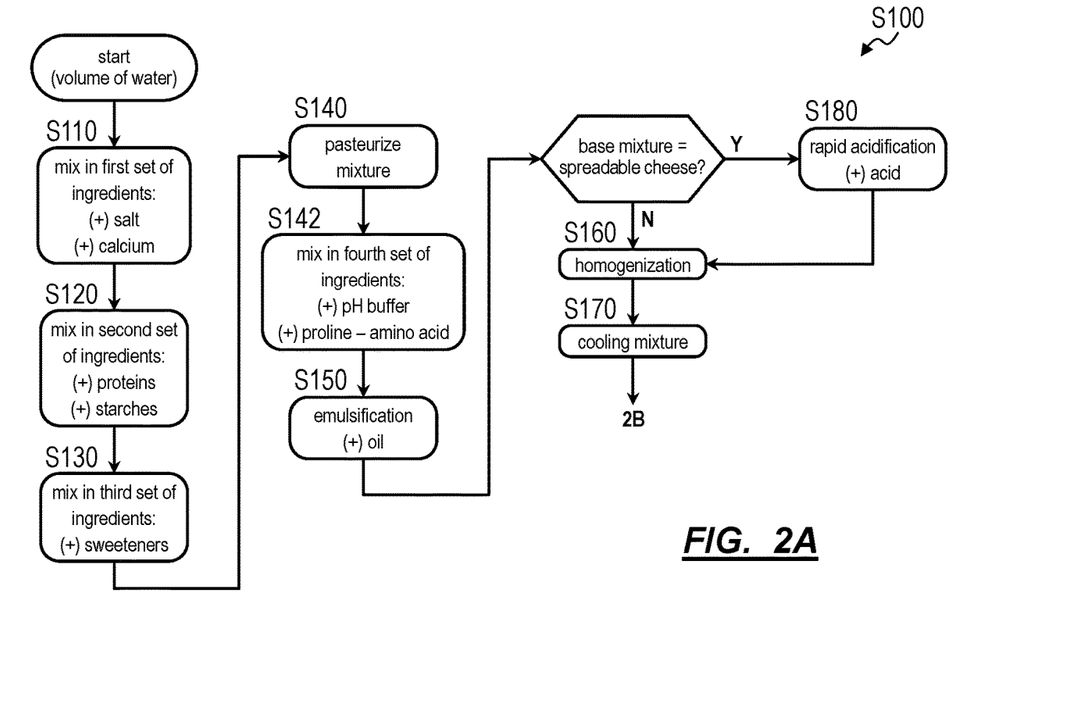
FIGS. 2A and 2B are flowchart representations of the method.
Figure 2B:
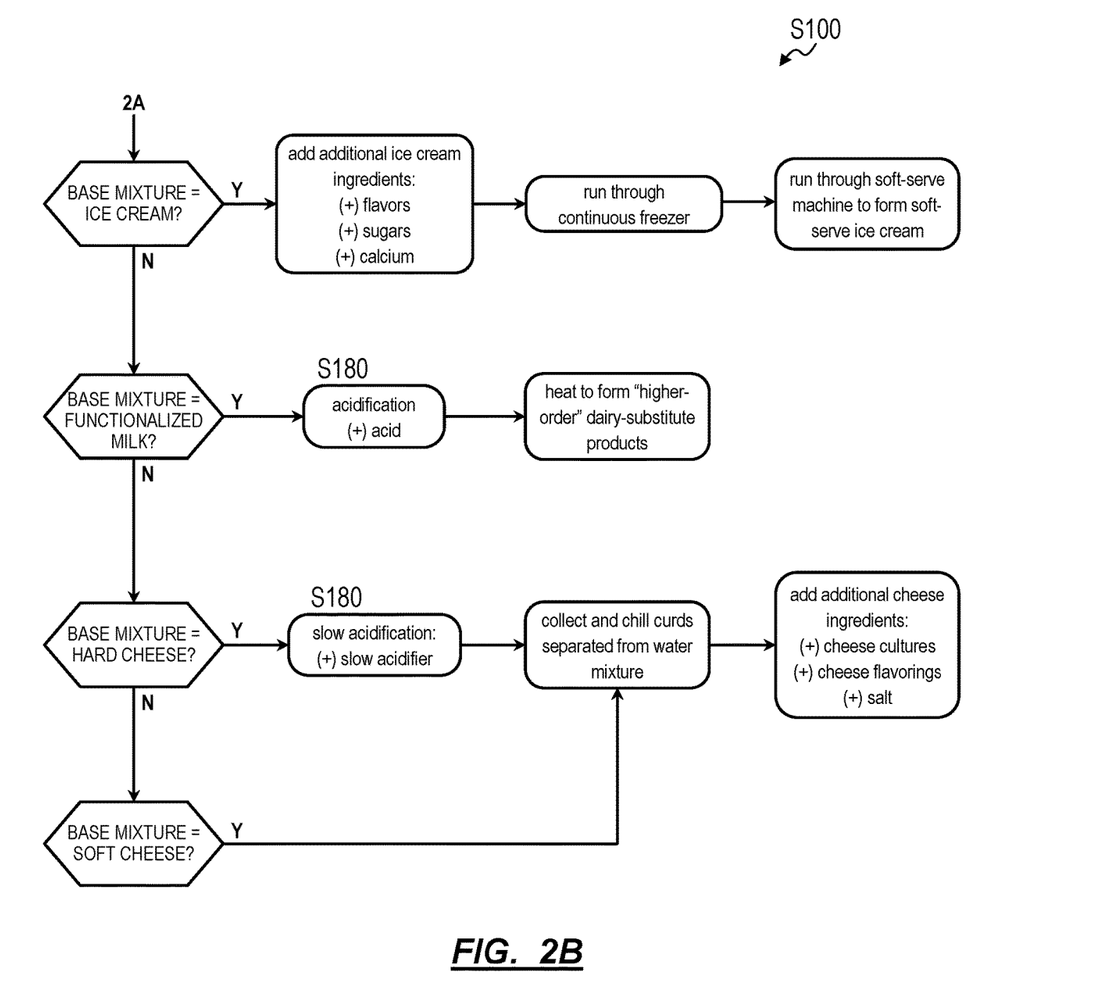

Generally, as shown in FIGS. 2A and 2B, a set of ingredients can be mixed to form a base mixture 100 that can be processed further—according to various food processing techniques and/or in combination with additional ingredients—to form various dairy-alternative end products, such as: a non-functional milk substitute for direct consumption; a functional milk substitute for baking, for at-home cheesemaking, or that may be frothed; non-dairy frozen yogurt; non-diary ice cream; non-diary cream cheese; non-diary soft cheese; non-diary hard cheese; etc. The base mixture 100 can include: water, salt, starches, sugars, proteins, and calcium. These ingredients can be mixed in particular concentrations designated for the base mixture 100 (or at concentrations designated for a particular end product derived from the mixture) and processed at high sheer to form a homogeneous mixture. These ingredients are then heated to a target temperature and emulsified with oil to reach a stable emulsion exhibiting substantially uniform oil droplet size (e.g., one to ten microns). This addition of oil to the homogeneous aqueous mixture initiates the formation of micelles in the resulting plant-based, non-dairy milk substitute. In particular, the base mixture 100 includes this set of ingredients and is processed to form micelles, which define microscopic structures that include hydrophobic and hydrophilic regions and are formed by aggregate surfactant molecules in aqueous solution, which enable the base mixture 100 to be transformed into many different forms, such as a non-dairy hard cheese, soft cheese, yogurt, cream, spread, ice cream, and/or butter, etc., much like a bovine milk. However, the base mixture 100 can include additional and/or any substitute ingredients to achieve qualities (e.g., taste, texture, functionality) of any other traditional dairy product.

Therefore, these ingredients can be combined in a particular sequence, at specific temperatures, and under particular conditions according to the method in order to enable and control micelle formation within the resulting base mixture 100. In particular, rather than rely on micelles that are naturally present—in varying concentrations—in bovine milk (or milk from other animals) for functionality, and rather than filter or mix large batches of bovine milk in order to achieve consistent micelle concentrations across bovine milk products, the ingredients of the base mixture 100 can instead be combined according to the method to yield any volume of base mixture 100 (e.g., from 10 grams to 10 cubic meters) with a consistent concentration (e.g., +/−0.1% by volume) of micelles.

Following micelle formation, this mixture can be homogenized in order to prevent phase separation and form a functionalized non-dairy base mixture 100. This functionalized non-dairy base mixture 100 can then be packaged and served directly to consumers, who may then froth (e.g., for coffee products), bake with, or make cheese with this functionalized non-dairy base mixture 100 in place of bovine milk (or milk from another animal). Additionally or alternatively, this functionalized non-dairy base mixture 100 can be selectively processed—such as with acidification or refrigeration processes—according to the method in order to form other end products, such as: non-diary ice cream; non-diary cream cheese; non-diary soft cheese; and non-diary hard cheese.

For example, the base mixture 100 can include both an aqueous phase 102 and an oil phase 104, due to the addition of oil during emulsification of the base mixture 100. Starches present in the base mixture 100 stabilize the aqueous phase 102 of the base mixture 100 and thus maintain components of the mixture in a homogeneous suspension. A cassava base starch in the base mixture 100—which can exist in both the aqueous phase 102 and oil phase 104—stabilizes fats in the oil. Proteins, which include both hydrophobic and hydrophilic tails, bind to both the aqueous phase 102 and the oil phase 104 in the mixture, thus forming a protective shell (or "barrier") between oil droplets 172 of the oil phase 104 and water and other components of the aqueous phase 102. This combination of proteins and starches thus enable emulsion of the oil into the aqueous phase 102 of the base mixture 100 via dispersion of oil droplets 172 throughout the aqueous phase 102 and to form a homogeneous mixture.

When the base mixture 100 (or emulsion) is acidified—such as by addition of lactic or citric acid, the proteins expel both water and oil and seek starches that are currently bound to oils in the emulsion. The starches in the water phase thus separate to yield an aqueous phase 102 with salts, sugars, and starches. The resulting functionalized base mixture 100 can then be: chilled and processed in an ice cream machine to form ice cream; chilled, further acidified, and treated with an appropriate culture to form frozen yogurt; further chilled to form whipped topping; heated and further acidified before being chilled to form soft cheese (e.g., a mozzarella, cream cheese); or heated, further acidified, chilled, and then aged to form a hard cheese. These end products may therefore form non-dairy alternatives to traditional dairy products that exhibit similar functionalities, textures, stiffness, viscosities, thermo-reversibilities, and meltabilities as their dairy counterparts.

The base mixture 100 can be mixed to include additional ingredients—such as waxy maize, tapioca maltodextrin, natural flavors, and/or bioavailable trace minerals—such that resulting end products exhibit similar flavors and functionalities as their dairy counterparts.

4. Base Mixture

The base mixture 100 can be processed to produce a set of end products—such as frozen yogurt or a hard cheese. In particular, the base mixture 100 can be modified to produce various "higher-order" dairy-substitute products including: functional milk (e.g., a non-dairy milk product processed to form micelles that enable transformation into cheese); soft-serve ice cream; hard-packed ice cream; yogurt; whipped cream; spreadable cheeses; soft cheeses; and/or hard cheeses; etc.

Generally, (substantially) regardless of end product, the base mixture 100 includes a base set of ingredients including: water, salt, calcium, starches, proteins, sugars, and oil. The base mixture 100 can be adjusted to include varying concentrations of each of these ingredients based on designated end product. In one implementation, the base mixture 100 includes: a proportion of water 110; a proportion of salt 120; a proportion of calcium 130; a proportion of starch; a proportion of protein; a proportion of sugar; and a proportion of oil. Depending on the end product, these proportions may be adjusted.

For example, a first batch of the base mixture 100—configured to generate whipped cream—can include: a first proportion of water 110, a first proportion of salt 120, a first proportion of calcium 130, a first proportion of starch, a first proportion of protein, a first proportion of sugar, and a first proportion of oil. A second batch of the base mixture 100—configured to generate ice cream—can include: a second proportion of water, a second proportion of salt, a second proportion of calcium, a second proportion of starch, a second proportion of protein, a second proportion of sugar, and a second proportion of oil, the second proportion of salt greater than the first proportion of salt 120. A third batch of the base mixture 100—configured to make cheese—can include: a third proportion of water, a third proportion of salt, a third proportion of calcium, a third proportion of starch, a third proportion of protein, a third proportion of sugar, a third proportion of oil, and a first proportion of acid, the third proportion of salt greater than the second proportion of salt. The third batch of the base mixture 100 includes a first proportion of acid, configured to promote micelle formation within this mixture. Additionally, the proportion of salt 120 (e.g., salt content) of the base mixture 100 may be adjusted between the three batches in order to regulate protein gelation and thus regulate a firmness of a resulting end product.

In one implementation, a single base mixture 100 can be developed and functionalized initially with one common set of target concentrations for its ingredients regardless of a designated end product. Additional ingredients may then be added to this base mixture 100 in order to prepare the base mixture 100 for transformation into a particular non-dairy end product, such as by adding additional salt to prepare the base mixture 100 for transformation into a soft-serve ice cream or adding an acid to prepare the base mixture 100 for transformation into a cheese. Therefore, a (large) volume of the base mixture 100 can be divided into multiple subvolumes, each of which may correspond to a particular end product and may be incorporated with additional ingredients and processed further to form other non-dairy substitutes.

For example, the base mixture 100 can initially include: a first proportion of water 110, a first proportion of salt 120, a first proportion of calcium 130, a first proportion of starch, a first proportion of protein, a first proportion of sugar; and a first proportion of oil. The base mixture 100 can be divided into a first subvolume designated to make whipped cream, a second subvolume designated to make soft-serve ice cream, and a third subvolume designated to make hard cheese. The first subvolume of the base mixture 100—designated to make whipped cream—can be set aside and processed to generate whipped cream accordingly. The second subvolume—designated to make ice cream—can be adjusted to further include: a second proportion of salt configured to limit hardening of a soft-serve ice cream end product; and a second proportion of sugars configured to promote freezing point depression of the soft-serve ice cream end product. The third subvolume of the base mixture 100—designated to make hard cheese—can be further adjusted to include a third proportion of salt and a first proportion of an acid configured to promote micelle formation in the third subvolume.

Similarly, the base mixture 100: can define a functional non-dairy milk substitute that may be consumed directly in place of animal (e.g., bovine) milk (e.g., in place of skim, 2%, or whole milk); and can serve as a starting point for producing other non-dairy products. For example, a consumer may: purchase a carton of the functional milk product from a grocer; acidify all or a portion of this volume of the functional milk substitute; add a coagulant to the acidified functional milk substitute to trigger curdling; cut the resulting curd; stir, cook, and wash the curd; draw water from the curds; and salt and age the resulting mass, thereby transforming the functional milk substitute into a (hard) cheese at home, such as in a residential kitchen with a microwave or residential stove. Alternatively, the base mixture 100—as a functional milk substitute—can be similarly processed in a factory setting to form cheese.

Alternatively, different base mixture 100s containing different concentrations of the base ingredients can be produced and functionalized according to the designated end product. For example, in this implementation, a volume of the base mixture 100 designated for a soft-serve ice cream can be mixed and emulsified with a higher initial salt concentration than a volume of the base mixture 100 prepared for a non-functional milk.

4.1 Base Mixture Properties

The base mixture 100 can be configured to exhibit features that correspond to taste, texture, and characteristics of corresponding dairy products. For example, the base mixture 100 can include ingredients at particular concentrations such that—when fully processed to generate a particular non-dairy end product corresponding to a traditional dairy product—the base mixture 100 mimics the taste, texture, and characteristics of the traditional dairy product. The base mixture 100 can be configured to exhibit features similar to traditional dairy products such as: hardness and/or firmness, melting temperature range, freezing point range, freezing point depression, percent overrun, oil droplet size, oil droplet distribution, sweetness, etc.

Additionally, the functionalized base mixture 100 102 exhibits features that enable the functionalized base mixture 100 102 to behave similarly to dairy milk. More specifically, the base mixture 100 includes an aqueous phase 102 and an oil phase 104 emulsified into the aqueous phase 102. The aqueous phase 102 includes water, starches, sugars, salts, and other solid ingredients. The oil phase 104 includes fats, starches, and proteins binding to these fats. Starches present in the aqueous phase 102 stabilize the base mixture 100 and function to maintain a homogeneous suspension of solid particles (e.g., ingredients) in the aqueous phase 102, thus preventing phase separation.

5. Base Mixture Composition

As shown in FIG. 1, the base mixture 100 is a homogeneous mixture of an aqueous phase 102 defining a homogeneous suspension of solid particles and an oil phase 104 defining a volume of oil droplets 172 approximately uniformly distributed throughout the aqueous phase 102.

Generally, the base mixture 100 includes a volume of water 110 and a set of ingredients added to the volume of water 110. The set of ingredients includes: a first proportion of salt 120, a first proportion of calcium 130, a first proportion of protein 140, a first proportion of starch 150, a first proportion of sweeteners 160 (e.g., sugar), and a first proportion of fats 170.

The base mixture 100 defines an aqueous phase 102 including: the first proportion of salt 120, the first proportion of calcium 130, the first proportion of proteins 140, the first proportion of starches 150, and the first proportion of sweeteners 160. The base mixture 100 further defines an oil phase 104 including a first proportion of fats dispersed within the aqueous phase 102. The base mixture 100 can be processed to form a homogeneous mixture including each of these ingredients.

The base mixture 100 can also include additional ingredients such as: oat fiber; waxy maize; tapioca maltodextrin; natural flavors; bioavailable trace minerals; and/or L. Glutamine.

5.1 Salt

The base mixture 100 includes a first proportion of salt 120 dissolved in a volume of water 110. Salt is initially added to water to form an aqueous salt-water mixture configured to hydrate proteins and starches of a protein-starch blend and promote unfurling of proteins. The base mixture 100 thus includes salt to promote unfurling of proteins in an aqueous mixture of salt and calcium prior emulsifying oil into the aqueous phase 102.

Additionally, the base mixture 100 can include salt to prevent proteins in the base mixture 100 from forming a solid gel. The salt content can be adjusted to regulate an extent of protein gelation and a consistency of an end product produced by the base mixture 100. Thus, the base mixture 100 can include different concentrations of salt for different end products to adjust consistency and texture of the base mixture 100 for a particular end product. For example, if the base mixture 100 designates whipped cream as the end product, the base mixture 100 can include a relatively low proportion of salt 120—above a minimum threshold—for increased protein gelation and thus increased firmness of the whipped cream. However, if the base mixture 100 designates ice cream as the end product, the base mixture 100 can include a higher proportion of salt 120—below a maximum threshold—to achieve a creamier texture similar to a traditional dairy ice cream product.

Further, the base mixture 100 can include varying proportions of salt to adjust freezing point temperatures and/or regulate freezing point depressions of end products. For example, for a base mixture 100 designating ice cream as an end product, a subvolume of the base mixture 100 can include a first proportion of salt 120 and exhibit a first freezing point. This first subvolume of the base mixture 100 may be packed in pint-size containers and stored in freezers at grocery stores. A second subvolume of the base mixture 100 can include a second proportion of salt greater than the first proportion of salt 120 and exhibit a second freezing point less than the first freezing point. This second subvolume of the base mixture 100 may be stored in display freezers at ice cream shops, these display freezers maintained at lower temperatures than typical freezers at grocery stores. Thus, by including a higher salt content, the base mixture 100 exhibits freezing point depression and can be stored at lower temperatures while maintaining similar consistency (e.g., for ease of serving or scooping ice cream).

5.2 Calcium

The base mixture 100 can include a first proportion of calcium 130. Calcium is added to the aqueous salt-water mixture in preparation for addition of the protein-starch blend. Different forms of calcium can be added to the salt-water mixture dependent on the specified end product. The base mixture 100 can include different forms of calcium such as: calcium citrate, calcium lactate gluconate, calcium anhydrous chloride, etc.

The base mixture 100 can include different forms and different concentrations of calcium to regulate protein gelation and/or rigidity of the base mixture 100. As calcium acts as a binder between the aqueous phase 102 and the oil phase 104 in the emulsion, the base mixture 100 can include different concentrations and types of calcium in the mixture to adjust a degree and duration of binding between water and oil droplets 172 in the base mixture 100.

For example, a first subvolume of the base mixture 100 may designate a soft cheese as the end product. The first subvolume can include a first proportion of calcium 130. A second subvolume of the base mixture 100 may designate a hard cheese as the end product. The second subvolume can include a second proportion of calcium greater than the first proportion of calcium 130, the second proportion of calcium configured to promote binding between the aqueous phase 102 and the oil phase 104 of the base mixture 100 throughout an extended aging process of the hard cheese. Thus, by including a greater proportion of calcium 130, the second subvolume of the base mixture 100 exhibits stronger binding between the aqueous phase 102 and the oil phase 104 over an extended duration when compared to the first subvolume of the base mixture 100.

Additionally, the base mixture 100 can include different forms and concentrations of calcium to regulate overrun in the end product.

5.3 Protein

The base mixture 100 includes a first proportion of protein 140s. Proteins in the base mixture 100 act as an emulsifier between the aqueous phase 102 and the oil phase 104 of the base mixture 100. Proteins include both hydrophobic heads and hydrophilic tails, which in combination enable the proteins to bind the aqueous phase 102 and the oil phase 104 to form the emulsion.

In one implementation, the base mixture 100 includes a first proportion of a particular potato protein extracted from peels of potatoes. The base mixture 100 can include a low pH stable potato protein extracted from these potato peels via protein precipitation at relatively low PH levels (e.g., pH less than 4). Additionally and/or alternatively, the base mixture 100 can include a neutral pH stable protein. In another implementation, the base mixture 100 includes a first proportion of a particular potato protein extracted from peels of potatoes grown in the Netherlands.

The base mixture 100 can include the first proportion of protein 140s proportional to a proportion of fats included in the oil phase 104, such that proteins fully emulsify oil droplets 172 in the base mixture 100. Additionally, the base mixture 100 can include the first proportion of protein 140s proportional to the first proportion (or "volume") of water such that proteins are fully hydrated by water in the aqueous phase 102. Protein concentration can be modified relative to concentration of other ingredients in the base mixture 100 in order to regulate an extent of protein gelation, which affects structure of the base mixture 100 and end product. For example, a base mixture 100 can specify whipped cream as an end product. This base mixture 100 can include the first proportion of protein 140s configured to exhibit a greater extent of protein gelation, such that the first proportion of protein 140s exhibit high overrun and thus hold (or trap) air pockets in the base mixture 100. Thus, the base mixture 100 can be configured to include proteins that hold air in the base mixture 100, as opposed to traditional dairy products which include fats that hold air.

The base mixture 100 can include varying concentrations of protein to modify protein concentration based on the final product. In one implementation, the base mixture 100 includes a first proportion of protein 140s defining between two percent and eight percent of the base mixture 100 by weight.

Additionally, traditional dairy products typically specify a particular protein content. The base mixture 100 can be configured to reproduce this particular protein content in the base mixture 100 and thus in non-dairy end products, in order to achieve similar protein contents as dairy counterparts.

5.4 Starch

The base mixture 100 includes a first proportion of starch 150. The base mixture 100 includes the first proportion of starch 150 configured to stabilize the aqueous phase 102 of the base mixture 100 when mixing in additional ingredients and more specifically when emulsifying the oil into the base mixture 100. The starch stabilizes the aqueous phase 102 by promoting the homogeneous suspension of proteins and starches in the base mixture 100. By including starches configured to maintain this homogeneous suspension, the base mixture 100 can limit any phase separation, such that non-dairy end products exhibit smooth textures and consistencies similar to dairy counterparts.

The base mixture 100 can include different concentrations of starches to modify viscosity of the aqueous mixture. For example, the base mixture 100 can include a higher concentration of starch in the base mixture 100 configured to make ice cream, while the base mixture 100 can include a lower concentration of starch in the base mixture 100 configured to make yogurt. Thus, by including varying concentrations of starch, the base mixture 100 can exhibit different consistencies in the end product.

The base mixture 100 can include starches in various forms including: potato starch; cornstarch; cassava starch; waxy maize starch; tapioca maltodextrin; etc. The base mixture 100 can include a proportion of potato starch including starches extracted from peels of potatoes. The base mixture 100 can include starches and proteins extracted from the same type of potato. In one implementation, the base mixture 100 includes the first proportion of starch 150 including: a first quantity of potato starch; a first quantity of cornstarch; and a first quantity of cassava starch. In another implementation, the base mixture 100 includes the first proportion of starch 150 including: a first quantity of potato starch; a first quantity of cornstarch; a first quantity of cassava starch; a first quantity of waxy maize starch; and a first quantity of tapioca maltodextrin. In another implementation, the base mixture 100 includes the first proportion of starch 150es including: a first quantity of potato starch; a second quantity of waxy maize starch; and a third quantity of Tapioca Maltodextrin.

5.5 Sweetener

The base mixture 100 includes a first proportion of sweetener 160. In addition to sugar, the base mixture 100 can include a first proportion of sweetener 160 such as: sugar, glucose, dextrose, maltose, corn syrup, tapioca syrup, brown rice syrup, etc. In one implementation, the base mixture 100 includes a first proportion of sweetener 160 including a first quantity of sugar and a first quantity of glucose.

The base mixture 100 can include varying concentrations of sweeteners configured to modify the taste and texture of the end product. The base mixture 100 includes sweeteners (e.g., sugar, glucose) and other solids in the aqueous phase 102 of the base mixture 100. Inclusion of additional solids in the base mixture 100 increases stability and firmness of the aqueous solution. Thus, by including increased sweetener concentration in the base mixture 100, the base mixture 100 can exhibit greater stability and better consistency.

Additionally, the base mixture 100 exhibits greater freeze point depression with higher concentrations of sweetener. In particular, the base mixture 100 can include higher concentrations of particular sweeteners (e.g., sucrose) in order to lower the freeze point of an end product. For example, a first subvolume of the base mixture 100 can include a first proportion of sweetener 160s including a first quantity of glucose and a first quantity sucrose, the first subvolume of the base mixture 100 exhibiting a first freeze point of 28 degrees Fahrenheit. A second subvolume of the base mixture 100 can include a second proportion of sweeteners—the second proportion greater than the first proportion—including the first quantity of glucose and a second quantity of sucrose greater than the first quantity of sucrose, the second subvolume of the base mixture 100 exhibiting a second freeze point of 26 degrees Fahrenheit.

5.6 Fat

The base mixture 100 includes a first proportion of fat. The first proportion of fat may be the final ingredient added to the base mixture 100. Once the base mixture 100 reaches or exceeds a threshold temperature for emulsification, the oil may be added at a substantially consistent rate in order to generate uniform dispersion of approximately uniform oil droplets 172 (e.g., uniform shape, uniform size). The base mixture 100 includes a particular ratio of water to oil such to hydrate starches and sugars which compete for the same water content.

The base mixture 100 can include the first proportion of fat in the form of different oils depending on the specified end product. Fats and oils with higher saturated fat content may emulsify the base mixture 100 more readily and with greater consistency than fats with lower saturated fat content or unsaturated fat content. For example, olive oil contains a low saturated fat content and therefore may exhibit poor function as an emulsifier. Conversely, canola oil contains a high proportion of saturated fat content and can therefore emulsify the mixture more quickly and consistently and can persist in dispersion with the aqueous phase 102 of the base mixture 100 over a longer duration of time than olive oil.

Additionally, the base mixture 100 can include both unsaturated fats and saturated fats. For example, the base mixture 100 can include canola oil with high unsaturated fat content and low saturated fat content for the base mixture 100 configured to make ice cream. Alternatively, the base mixture 100 can include a rice bran oil with low unsaturated fat content and high saturated fat content for the base mixture 100 configured to make a hard cheese.

Additionally, the base mixture 100 can include additional fats configured to cooperate with unsaturated fats to act as substitute saturated fats. The base mixture 100 can include: monoglycerides; diglycerides; lecithin; etc.

6. Processing the Base Mixture

Generally, the base mixture 100 can initially incorporate the same set of (e.g., seven) ingredients, such as including: water, salt, calcium, starch, protein, sugar, and oil. However, concentrations of these base ingredients in the base mixture 100 may be set (i.e., adjusted) to yield different flavors, textures, stiffness, and/or states based on designated end products.

6.1 Preparing the Aqueous Phase

Block S110 of the method S100 recites treating a volume of water 110 with a first set of ingredients soluble in the volume of water 110, the volume of water 110 within a first temperature range. Generally, the first set of ingredients can be dissolved in the volume of water 110 to generate an aqueous solution.

In one implementation, the first set of ingredients includes the first proportion of salt 120 and the first proportion of calcium 130. In this implementation, the volume of water 110 can be treated with the first proportion of salt 120 and the first proportion of calcium 130 to prepare the aqueous phase 102 for addition of proteins and starches. Initially, the volume of water 110 can brought to or left at temperatures within a temperature range of approximately 40 degrees-F to 110 degrees-F (e.g., within ten percent), such that the first proportion of salt 120 and the first proportion of calcium 130 dissolve in the volume of water 110. The first proportion of salt 120 can be dissolved in the first proportion of water 110 to form an aqueous salt-water mixture. The first proportion of calcium 130 can then be added to the aqueous salt-water mixture to form a first (aqueous) mixture.

Block S120 of the method recites blending a second set of ingredients into the first mixture to generate a second mixture, the second set of ingredients including a protein-starch blend. The protein-starch blend can be mixed into the first mixture for a set duration (e.g., one minute, ten minutes, one hour) and at sufficient shear to achieve a homogeneous mixture of the protein-starch blend and the first mixture.

The protein-starch blend can be mixed prior to addition of this blend to the first mixture and can include a first proportion of protein 140s and a first proportion of starch 150es. In one implementation, the second set of ingredients includes: a first quantity of potato protein, a second quantity of potato starch, a third quantity of cornstarch, and a fourth quantity of cassava starch. These ingredients can be mixed separately from the first mixture to form the protein-starch blend.

The second set of ingredients can additionally include: a first proportion of tapioca maltodextrin; a first proportion of an oat hydrocolloid; a first proportion of a gum (e.g., locust bean, Arabic); and/or a first proportion of bioavailable trace minerals.

The protein-starch blend can be mixed into the first mixture for a set duration corresponding to a volume of the first mixture. For example, if the volume of the first mixture is relatively small (e.g., less than 10 gallons), the protein-starch blend can be mixed into the first mixture for a set duration of 5 minutes. However, if the volume of the first mixture is relatively large (e.g., greater than 500 gallons), then the protein-starch blend can be mixed into the first mixture for a set duration of 20 minutes. Thus, the protein-starch blend can be mixed into the first mixture for the set duration proportional to the volume of the first mixture, in order to achieve homogeneity of the second mixture including both the first and second set of ingredients. The second mixture is then set to hydrate with no sheer for a set duration between 20 seconds and 30 minutes.

In one implementation, the protein-starch blend is mixed into the aqueous solution via a high-shear impeller. For example, the protein-starch blend can be mixed into the aqueous solution via a high shear bottom impeller operating between 1800 revolutions per minute and 2100 revolutions per minute for a set duration of 5 minutes.

In one variation, the second set of ingredients further includes sweeteners. For example, the second set of ingredients including proteins, starches, and sweeteners (e.g., sugar, glucose) can be mixed into the first solution to form the second solution. Sweeteners can be included in the second set of ingredients to promote dispersion of dry ingredients (e.g., starches) in the second mixture. Alternatively, sweeteners can be added following a hydration process in which proteins and starches absorb water from the aqueous solution.

Following addition of the second set of ingredients, the second solution can be left to hydrate for a set duration (e.g., 1 minute, 5 minutes, 30 minutes) with no shear to enable hydration of the second set of ingredients (e.g., proteins, starches) in the second mixture.

Block S130 of the method S100 recites adding a third set of ingredients to the second mixture in a standard sequence to form a third mixture. The third set of ingredients can include sweeteners, such as: sugar; glucose; sucrose; maltose; corn syrup, tapioca syrup; flavorings (e.g., cocoa powder); etc. In one implementation, the third set of ingredients includes sugar, glucose, and sucrose. The proportions of each of these sweeteners may be adjusted depending on the desired end product.

7. Pasteurization

Block S140 of the method recites pasteurizing the third mixture, within a set temperature range and for a set duration. The third mixture can be heated to temperatures within the first temperature range (e.g., 150 degrees-F to 200 degrees-F) and held in this second temperature range for a set duration (e.g., 20 minutes, 30 minutes, 1 hour) to pasteurize the third mixture. For example, the third mixture—defining a homogeneous suspension of salt, calcium, proteins, starches, and sugars in water—can be heated to a temperature of 160 degrees and held at this temperature for a duration of 30 minutes. The third mixture can be pasteurized to eliminate harmful bacteria and/or other contaminants present in the third mixture before undergoing further processing.

In one variation, following pasteurization, a fourth set of ingredients can be added to the third mixture to generate a fourth mixture. The fourth set of ingredients can include a first proportion of sodium bicarbonate and a first proportion of a basic amino acid (e.g., proline). The base mixture 100 can include this fourth set of ingredients to buffer a pH level of the base mixture 100, such that the pH level is increased and the base mixture 100 is less acidic. Additionally, the base mixture 100 can include this proportion of the basic amino acid to neutralize and/or counteract tannins present in proteins in the base mixture 100—in order to achieve a particular taste profile on the palate.

7.1 Emulsification

Following pasteurization, the base mixture 100 including these ingredients is then heated to a target temperature and emulsified with oil to reach a stable emulsion. The base mixture 100 can thus undergo a high shear coarse emulsion to achieve this stable emulsion exhibiting substantially uniform oil droplet size (e.g., diameter less than 10 microns). For example, a base mixture 100 configured to make a non-dairy milk end product may exhibit substantially uniform oil droplet size between 4 microns and 6 microns.

During emulsification, the base mixture 100—and more specifically the proteins in the base mixture 100—can be heated to a temperature above their isoelectric point, a temperature at which the proteins are stable (e.g., stay in suspension in the mixture). During this heating process, the oil is emulsified into the base mixture 100 at a steady rate to achieve a stable emulsion between the aqueous phase 102 and the oil phase 104 of the base mixture 100.

In one implementation, the base mixture 100 is heated to a first target temperature before adding in the oil. Upon reaching the first target temperature, a first proportion of oil is added to the base mixture 100. For example, a canola oil can be added to prepare the base mixture 100 for processing into whipped cream; and a rice bran oil can be added to prepare the base mixture 100 for processing into hard cheese. By adding the oil at the first target temperature, stability of the aqueous phase 102 of the mixture may increase, thereby enabling emulsion of the oil into the aqueous mixture to occur more readily and more consistently. The temperature of the mixture is then further increased to a second target temperature (e.g., approximately 80 degrees Celsius) and held at this second target temperature for a target dwell time selected for the end product (e.g., between five and 27 minutes) such that the mixture is a homogeneous blend, stable, and fully emulsified. The temperature of the mixture is again increased to a peak temperature (e.g., approximately 75 degrees Celsius); additional flavorings specific to the end product may then be added to the mixture occupying this third target temperature. Adding these flavorings to the mixture upon reaching this peak temperature and toward the end of this emulsification process may limit degradation of these flavorings due to excess temperature exposure during this temperature ramp.

This addition of oil to the homogeneous aqueous mixture initiates the formation of micelles in the resulting plant-based, non-dairy milk substitute. In particular, the base mixture 100 includes ingredients and is processed to form micelles, which define microscopic structures that include hydrophobic and hydrophilic regions and are formed by aggregate surfactant molecules in aqueous solution, which enable the base mixture 100 to be transformed into many different forms, such as a non-dairy hard cheese, soft cheese, yogurt, cream, spread, ice cream, and/or butter, etc., much like (traditional) animal milk.

Therefore, these ingredients can be combined in a particular sequence, at specific temperatures, and under particular conditions according to the method S100 in order to enable and control micelle formation within the resulting base mixture 100. In particular, rather than rely on micelles that are naturally present—in varying concentrations—in animal milk (e.g., bovine milk) for functionality, and rather than filter or mix large batches of bovine milk in order to achieve consistent micelle concentrations across bovine milk products, the ingredients of the base mixture 100 can instead be combined according to the method to yield any volume of base mixture 100 (e.g., from 10 grams to 10 cubic meters) with a consistent concentration (e.g., +/–0.1% by volume) of micelles.

8. Homogenization

Following emulsification of the oil into the base mixture 100, the base mixture 100 can be homogenized in order to prevent phase separation and form the functionalized non-dairy base mixture 100. More specifically, the base mixture 100 is homogenized to achieve uniform particle distribution, particle size, fat globule distribution, and fat globule size, each of which may cooperate to prevent phase separation within the base mixture 100 and promote a consistent base mixture 100. The base mixture 100 can be configured to exhibit particle and fat distribution and sizes substantially similar to dairy counterparts.

In one variation, the base mixture 100 is cooled from higher temperatures during emulsification to lower temperatures (e.g., less than 40 degrees Fahrenheit) prior to homogenization of the base mixture 100.

The base mixture 100 can be homogenized within a set duration following emulsification, such as to limit reactions occurring between ingredients in the base mixture 100. For example, a proportion of amino acids may interact with sugar in the base mixture 100 to generate molotol at particular temperatures and over a period of time. Thus, the base mixture 100 can be homogenized rapidly following emulsification of the base mixture 100 to limit molotol generation (e.g., malty flavors) in the base mixture 100.

The base mixture 100 can be homogenized via a triple plate homogenizer at a set (e.g., relatively high) temperature. For example, the base mixture 100 can be homogenized via a triple plate homogenizer operating between 800-2200 psi. Alternatively, the base mixture 100 can be homogenized via ultrasonic homogenization or cavitation homogenization.

9. Cooling & Further Processing

Following homogenization, if not previously cooled, the base mixture 100 can be rapidly cooled from high temperatures during homogenization to lower temperatures (e.g., less than 40 degrees Fahrenheit). The base mixture 100 can be cooled via a heat exchanger. For example, the base mixture 100 can be run through a plate heat exchanger to reduce a temperature of the base mixture 100 from approximately (within 10 degrees Fahrenheit) 150 degrees Fahrenheit during homogenization to approximately (within 10 degrees Fahrenheit) 38 degrees Fahrenheit following cooling. The base mixture 100 can be cooled quickly (within a set duration following homogenization) in order to limit side reactions between ingredients (e.g., proline and sweeteners generating malt flavors).

Once the base mixture 100 is generated—with varying concentrations of each base ingredient depending on the selected end product—and functionalized, the base mixture 100 can be stored at cool temperatures (e.g., less than 40 degrees Fahrenheit). Later, the base mixture 100 can be heated and mixed with various amounts of sheer and over various mixing times to transform the base mixture 100 into a particular end product. For example, the base mixture 100 can be loaded directly into an ice cream machine to transform the base mixture 100 directly into a non-dairy (e.g., a "plant-based") ice cream. In another example, the base mixture 100 can be acidified to produce a soft cheese, such as a feta cheese.

More specifically, to produce a higher-order dairy product from the functional base mixture 100, such as a whipped cream or cheese, an acid can be added (e.g., in trace amounts) to the base mixture 100. Depending on the selected higher-order dairy product, the acid can be introduced before increasing the temperature of the base mixture 100 and emulsifying in the oil (e.g., cream cheese) or the acid can be introduced after emulsification and after the mixture is allowed to cool (e.g., frozen yogurt, feta cheese, or cheddar cheese). For example, a moderate proportion of acid (e.g., 0.2% by weight) can be added to the base mixture 100 when transforming the base mixture 100 into a soft cheese, and a smaller proportion of acid (e.g., 0.1% by weight) can be added to the base mixture 100 when transforming the base mixture 100 into a hard cheese or other end product.

10. Variation: Non-Functional, Non-Dairy Milk Substitute

To produce a non-functional plant-based milk (e.g., to be consumed as a regular non-dairy milk substitute and not meant for transformation into other non-dairy products), the base mixture 100 does not need to complete micelle formation. For example, the base mixture 100—and more specifically the proteins in the base mixture 100—can be heated to a temperature above their isoelectric point, a temperature at which the proteins are stable (e.g., stay in suspension in the mixture). During this heating process, the oil is emulsified into the base mixture 100. Once the isoelectric point is reached, the base mixture 100 is stabilized, pasteurized, and then chilled. At this point, no flocculation has occurred in the base mixture 100, and the resulting non-dairy milk product (e.g., a low-order end product) is considered non-functional but may be consumed as non-dairy replacement for common milk (e.g., skim, 2%, or whole bovine milk).

This plant-based, non-dairy, non-functional milk product may thus function, taste, and yield a mouth feel similar to common bovine milk. For example, this milk product can be frothed to produce foam for certain milk-based drinks. This plant-based, non-dairy, non-functional milk product may also be added to other foods (e.g., a pasta sauce, scrambled eggs) without imparting flavors distinct from common bovine milk.

11. Functional, Non-Dairy Milk Substitute

The base mixture 100 can also be acidified to generate a plant-based, non-dairy, functional milk substitute. In particular, the addition of a small amount of acid (e.g., less than 0.2%) to the mixture functionalizes the potato protein.

For example, once the base mixture 100 is heated to a temperature at which the mixture reaches its isoelectric point, the base mixture 100 can be allowed to stabilize before cooling to a lower temperature, at which time the cooled base mixture 100 is acidified through the addition of a particular concentration of an acid or acidifier (e.g., lactic acid, citric acid, peroxyacetic acid, acetic acid, sodium acid sulfate) that lowers the pH of the base mixture 100. For example, sodium acid sulfate—which is not acidic—can be added to the base mixture 100 to lower its pH while amplifying salt and sugar flavors and without producing an acidic taste in the resulting end product.

After acidification, the base mixture 100 can be cooled to a lower temperature (i.e., less than its isoelectric point temperature) while mixed at a specific shear, to produce the functionalized non-dairy base with micelles.

The base mixture 100 can undergo rapid acidification via the addition of a first proportion of acid. The first proportion of acid can include: lactic acid; citric acid; sodium acid sulfate; or any combination of these acids. Rapid acidification can be implemented for making softer or spreadable cheeses (e.g., cream cheese). During rapid acidification, the base mixture 100 can be heated to a threshold temperature before addition of the first proportion of acid. Addition of the acid promotes micelle formation with the base mixture 100, which may then be cooled down for further processing. The acid can be added before emulsification of the oil into the base mixture 100.

Alternatively, the base mixture 100 can undergo slow acidification. After the base mixture 100 is cooled following homogenization, the base mixture 100 can undergo slow acidification via addition of a slow acidifier to the base mixture 100, such as a microbial rennet or a lactobacillus. Upon addition of this slow acidifier, the base mixture 100 expels water from the aqueous phase 102 out of the base mixture 100. The slow acidifier causes proteins in the base mixture 100 to lose charge and therefore expel water absorbed by these proteins. The proteins then bind with starches bound to oils in the oil phase 104, while the aqueous phase 102 separates out, forming curds. Thus, slow acidification can be implemented for making hard cheeses.

Again, depending on the end product, the sequence of steps in the process of acidification may be reordered. For example, when making a mozzarella cheese, the process is similar to the process for making cream cheese. Early acidification still occurs, but to a greater extent (e.g., with a higher acid concentration) in order to achieve a tighter bonded structure between the micelle molecules and therefore stronger curd formation during the flocculation process. The curds can then be placed in a salt water bath with a temperature of approximately 80-85 degrees Celsius. The curds can then be stretched into sheets of "mozzarella cheese", before continuing the process.

12. Non-Dairy Frozen Desserts

Frozen desserts and certain whipped dairy products or spreadable cheeses may not fully complete the micelle formation process. Starting with the base mixture 100, an additional quantity of salt can be added to ensure the appropriate frozen dessert consistency. This modified base mixture 100 can be run through a soft-serve or ice cream machine to output the non-dairy frozen dessert alternative, without requiring any further processing, due to the functionalized potato protein. In one implementation, the base mixture 100 can include canola oil as the source of fats when making the base mixture 100 for alternative frozen dessert products, as micelle formation is not necessary and therefore an oil with a high saturated fat content is not needed. Also, because the dessert product will be either refrigerated or frozen, the oxidation will be very slow and the product will have a long shelf life. Alternatively, a different unsaturated fat or combination of unsaturated fats can be used. For example, if the selected product is a "lemon rosemary gelato", a specific olive oil may be selected for emulsion into the base mixture 100, dependent on the flavor and texture of the dessert.

Ice cream end products (e.g., hard-packed ice cream, soft serve ice cream, gelato, etc.) can include varying proportions of salt, calcium, and sweeteners to control freezing point depression of the ice cream end product. Additionally, base mixture 100$s$ for these products can include varying proportions of sweeteners to regulate freezing point depression. For example, the base mixture 100 can define an ice cream base mixture 100. The ice cream base mixture 100 can be characterized by a scoopability range defining a range of temperatures at which the ice cream base mixture 100 exhibits at least a threshold scoopability (e.g., as a function of force applied to scoop consistent, smooth, frozen ice cream). The ice cream base mixture 100 can: include a first proportion of salt 120, a first proportion of calcium 130, and a first proportion of sweetener 16$os$, each of which cooperate to regulate a freezing point range of the ice cream base mixture 100; exhibit a scoopability temperature range corresponding to the freezing point range; and define a sweetener ratio of a quantity of glucose to an quantity of sucrose between one and four. In this example, the ice cream base mixture 100 can regulate the freezing point range between twenty degrees Fahrenheit and thirty degrees Fahrenheit. The scoopability range corresponds to a temperature range in which ice cream exhibits a favorable texture and consistency for scooping (or serving) frozen ice cream without difficulty. A first subvolume of the ice cream base mixture 100 can: exhibit a first sweetener ratio of two; exhibit a first freezing point temperature within the freezing point range; and exhibit a first scoopability temperature range between ten degrees Fahrenheit and fifteen degrees Fahrenheit. A second subvolume of the ice cream base mixture 100 can: exhibit a second sweetener ratio of four; exhibit a second freezing point temperature less than the first freezing point temperature; and exhibit a first scoopability temperature range between five degrees Fahrenheit and ten degrees Fahrenheit. Thus, by increasing the ratio of sucrose to glucose in the ice cream base mixture 100, the ice cream base mixture 100 exhibits a lower freezing point temperature and higher scoopability (e.g., above the threshold scoopability) at lower temperatures.

The base ingredients can be combined at varying concentrations, depending on the selected end product. For example, when making a whipped cream product, the salt percentage in the base mixture 100 can be decreased to be significantly less than the salt percentage in the base mixture 100 for most other products, including ice cream or cheese. The lower salt percentage in the base mixture 100 allows a minimum protein gelation to achieve a similar texture and shape of regular whipped cream, while the proteins can still withhold air. If the salt content is lowered beyond a minimum threshold, the protein gelation will not occur, and the proteins cannot withhold air. Protein gelation is necessary for the end product formation in order for the product to have a specific shape, texture, and firmness. In regular dairy product production (e.g., whipped cream production), the fats in dairy milk hold the air. In this non-dairy product production, the proteins are manipulated to hold the air.

13. Variation: Non-Dairy Spreadable and Soft Cheeses

Additional processing is necessary to form soft cheeses from the base product. The base mixture 100 includes the same ingredients, but may include different concentrations of these ingredients. The process also involves mixing the base mixture 100 at a higher shear than the process for producing non-functional milk. As the oil is emulsified into the base mixture 100, at a temperature near 70 degrees Celsius, the temperature is still increased until it reaches approximately 80 degrees Celsius. At this temperature, the mixture is then held for a first duration of time ranging from 5-27 minutes, depending on the end product. For a softer cheese, the duration of time held at this temperature can be shorter than the duration for a harder cheese. After the first duration, the temperature is again increased to approximately 85 degrees Celsius. Once this temperature is reached, various flavors can be added to the mixture depending on the specific end product. After addition of the flavors, the mixture can be rapidly chilled back down, via a plate exchanger system. At this point, the mixture can be used as a base mixture 100 or as an ice cream base. In order to achieve a soft cheese, a flocculation process must occur to produce curds in the mixture. This is achieved by acidification of the mixture, and then allowing the mixture to further cool in a refrigeration process. Additional cultures may be added for flavoring depending on the end product. For example, a certain culture may be added to the "cheese" to achieve a feta cheese flavor, whereas a different culture may be added to the "cheese" to achieve a Brie cheese flavor. A set of holding tanks can be used as the mixture flocculates and separates out the curds from the milk, which can be drained and collected as functional milk, or undergo further processing to produce other dairy products.

The acidification step can be performed at different times in the process, depending on the end product. For example, when making a spreadable cheese such as cream cheese, acidification occurs before the temperature ramp begins. In this implementation, before adding the oil and beginning the emulsification, the mixture is initially acidified, which causes the proteins and starches to bind more tightly. The oil, more specifically an oil-starch slurry, is then emulsified into this acidified mixture with the tightened protein and starch bonds, which forces the micelle formations 14. Variation: Non-Dairy Aged and Hard Cheeses To make hard cheeses from the base mixture 100, the mixture must undergo additional processing. Although the initial process is similar, a slow acidification is implemented rather than the rapid acidification used when making the non-functional milk or softer cheeses. In this process, the base mixture 100 including the salt, calcium, starch, protein, sugars and flavor are mixed together accordingly, and the temperature ramp up is initiated. The speed of the mixture is increased as the temperature increases to get a higher shear. At approximately 70 degrees Celsius, the oil is emulsified into the mixture. For a hard cheese, the oil can be an oxidative stable oil with a high saturated fat content (e.g., a vegetable oil, or oils that are solid at room temperature). Once the oil is fully emulsified in the mixture and the temperature of the mixture reaches approximately 80 degrees Celsius, the mixture is allowed to continue mixing and homogenize for a certain duration (e.g., between 5 minutes and 27 minutes) and then again increased in temperature to approximately 85 degrees Celsius. At this temperature, the flavors for the specific type of hard cheese are added to the mixture (e.g., cheddar flavors for a "cheddar cheese").

After the flavors are added and the emulsification process is complete, the mixture can be refrigerated and chilled to approximately 40-45 degrees Celsius, and can then undergo a slow acidification process. For example, a slow acidifier such as a microbial rennet or a lactobacillus may be added to the mixture so that micelles begin to form and the cheese is slowly formed. Excess water expels out of the bottom of the mixture, separating from the curds, allowing for cheese formation. The cheese can be chilled even further in the refrigerator, and additional cheese cultures may be added to the cheese for flavoring once the temperature reaches approximately 30-35 degrees Celsius. Additionally, depending on the end product, more ingredients may be added, such as additional salt if the selected cheese product is a "salty" cheese (e.g., mozzarella).

Again, depending on the end product, the sequence of steps in the process may be reordered. For example, when making a mozzarella cheese, the process is similar to the process for making cream cheese. Early acidification still occurs, but to a greater extent (e.g., with a higher acid concentration) in order to achieve a tighter bonded structure between the micelle molecules and therefore stronger curd formation during the flocculation process. The curds can then be placed in a salt water bath with a temperature of approximately 80-85 degrees Celsius. The curds can then be stretched into sheets of "mozzarella cheese", before going through the rest of the process.

As a person skilled in the art will recognize from the previous detailed description and from the figures and claims, modifications and changes can be made to the embodiments of the invention without departing from the scope of this invention as defined in the following claims.

We claim:

1. A base mixture comprising:
an aqueous phase comprising:
a proportion of water;
a proportion of salt dissolved in the proportion of water;
a proportion of calcium dissolved in the proportion of water;
a proportion of plant-extracted proteins configured to form a barrier between the aqueous phase and oil droplets of an oil phase;
a proportion of starches configured to stabilize the aqueous phase and the oil phase; and
a proportion of sweeteners; and
an oil phase:
comprising a volume of oil droplets dispersed throughout the aqueous phase and immiscible in the aqueous phase; and
configured to cooperate with the aqueous phase to form an emulsion excluding dairy proteins and configured to form a consumable non-dairy product.

2. The base mixture of claim 1:
further comprising a proportion of an acid; and
wherein the proportion of the acid is configured to neutralize polarity of proteins in the proportion of plant-extracted proteins and promote micelle formation between the proportion of plant-extracted proteins, the proportion of starches, and the volume of oil droplets.

3. The base mixture of claim 1, further comprising:
a proportion of a buffer configured to raise a pH of the base mixture; and
a proportion of an amino acid configured to counter desiccation of the base mixture generated by the proportion of plant-extracted proteins.

4. The base mixture of claim 1:
wherein the emulsion comprises an ice cream base mixture;
wherein the proportion of salt, the proportion of calcium, and the proportion of sweeteners cooperate to depress a freezing point of the ice cream base mixture; and
wherein the proportion of sweeteners comprises a first proportion of sucrose and a second proportion of glucose, the first proportion of sucrose greater than the second proportion of glucose.

5. The base mixture of claim 4:
wherein the oil phase comprises a first proportion of unsaturated fats and a second proportion of saturated fats, the first proportion of unsaturated fats greater than the second proportion of saturated fats; and
wherein the ice cream base mixture is configured to form a soft serve ice cream product when cooled and mixed within a soft-serve ice cream machine.

6. The base mixture of claim 5:
wherein the second proportion of saturated fats defines less than ten percent of the proportion of fats by weight; and
wherein the proportion of fats comprises canola oil.

7. The base mixture of claim 6:
wherein the proportion of salt, the proportion of calcium, and the proportion of sweeteners cooperate to depress the freezing point of the ice cream base mixture to a temperature within a freezing point range between twenty degrees Fahrenheit and thirty degrees Fahrenheit; and
wherein the proportion of calcium and proportion of plant-extracted proteins cooperate to support a threshold overrun in the ice cream base mixture.

8. The base mixture of claim 4:
wherein the proportion of salt, the proportion of calcium, and the proportion of sweeteners cooperate to depress the freezing point of the ice cream base mixture to within a freezing point range between twenty degrees Fahrenheit and thirty degrees Fahrenheit;
wherein the proportion of sweeteners is characterized by a sweetener ratio of the first proportion of sucrose to the second proportion of glucose;
wherein a first subvolume of the ice cream base mixture:
    exhibits a first sweetener ratio between 1 and 3;
    exhibits a first freezing point temperature within the freezing point range; and
    exhibits a first scoopability temperature range between ten degrees Fahrenheit and fifteen degrees Fahrenheit; and
wherein a second subvolume of the ice cream base mixture:
    exhibits a second sweetener ratio between 3 and 5;
    exhibits a second freezing point temperature less than the first freezing point temperature and within the freezing point range; and
    exhibits a second scoopability temperature range between five degrees Fahrenheit and ten degrees Fahrenheit.

9. A base mixture comprising:
a first proportion of water forming an aqueous phase;
a first proportion of salt dissolved in the aqueous phase;
a first proportion of calcium dissolved in the aqueous phase;
a first proportion of sweeteners dissolved in the aqueous phase;
a first proportion of fats:
    defining an oil phase; and
    configured to form oil droplets dispersed throughout the aqueous phase; and
a first proportion of plant-extracted proteins configured to cooperate with a first proportion of starches to:
    absorb water in the aqueous phase;
    absorb fats in the oil phase;
    form an interface between the aqueous phase and oil droplets of the oil phase to form an emulsion excluding dairy proteins; and
    form micelles responsive to acidification of the emulsion.

10. The base mixture of claim 9:
further comprising a first proportion of acid configured to promote micelle formation between the first proportion of proteins and the first proportion of starches, and the first proportion of fats.

11. The base mixture of claim 9:
further comprising:
    a second proportion of calcium;
    a second proportion of sweeteners; and
    second proportion of salt;
wherein the second proportion of calcium, the second proportion of sweeteners, and the second proportion of salt are configured to depress a freezing point of the emulsion; and
wherein the emulsion is configured to form a soft serve ice cream product when cooled and mixed within a soft-serve ice cream machine.

12. The base mixture of claim 1:
wherein the oil phase comprises a proportion of fats proportional to the proportion of proteins;
further comprising:
    a proportion of cultures configured to adjust flavoring of the base mixture; and
    a proportion of an acidifier configured to decrease a pH level of the base mixture and promote micelle formation within the base mixture; and
wherein the base mixture comprises a spreadable cheese base mixture.

13. The base mixture of claim 1:
further comprising a proportion of lactic acid configured to lower a pH level of the base mixture; and
wherein the base mixture comprises a non-dairy yogurt base mixture.

14. The base mixture of claim 9, wherein the first proportion of plant-extracted proteins comprises a first proportion of potato proteins.

15. The base mixture of claim 9, further comprising a second proportion of starches configured to:
absorb water from the first proportion of water; and
stabilize the aqueous phase in the emulsion.

16. The base mixture of claim 9:
wherein the base mixture comprises:
    a first volume comprising the emulsion and configured to form a first non-dairy product; and
    a second volume comprising a second emulsion and configured to form a second non-dairy product;
wherein the second volume of the base mixture comprises:
    a second proportion of water forming a second aqueous phase;
    a second proportion of salt dissolved in the second aqueous phase;
    a second proportion of calcium dissolved in the second aqueous phase;
    a second proportion of sweeteners dissolved in the second aqueous phase;
    a second proportion of fats greater than the first proportion of fats of the first emulsion, the second proportion of fats:
        defining a second oil phase; and
        configured to form oil droplets dispersed throughout the second aqueous phase; and a second proportion of a protein-starch blend comprising:
  a second proportion of proteins and a second proportion of starches configured to:
    absorb water in the second aqueous phase;
    absorb fats in the second oil phase;
    form an interface between the second aqueous phase and oil droplets of the second oil phase to form the second emulsion; and
    form micelles responsive to acidification of the second emulsion.

17. The base mixture of claim 16:
wherein the first volume of the base mixture configured to form the first non-dairy product comprises a non-dairy ice cream base mixture configured to form a non-dairy ice cream product; and
wherein the second volume of the base mixture configured to form the second non-dairy product comprises a non-dairy spreadable cheese mixture configured to form a non-dairy spreadable cheese product.

18. A base mixture comprising:
a first proportion of water forming a first aqueous phase;
a first proportion of salt dissolved in the first aqueous phase;
a first proportion of calcium dissolved in the first aqueous phase;
a first proportion of proteins:
  comprising a first proportion of plant-based proteins and excluding dairy proteins; and
  configured to form an interface between the first aqueous phase and oil droplets of a first oil phase;
a first proportion of starches configured to stabilize the first aqueous phase and the first oil phase;
a first proportion of fats comprising a first volume of oil droplets configured to form an emulsion with the first aqueous phase; and
wherein the base mixture comprises:
  a first subvolume configured to form a first consumable non-dairy product; and
  a second subvolume configured to form a second consumable non-dairy product.

19. The base mixture of claim 18:
wherein the first subvolume comprises an ice cream base mixture configured to form a non-dairy ice cream product;
wherein the second subvolume comprises a spreadable cheese base mixture configured to form a non-dairy spreadable cheese product;
wherein the spreadable cheese base mixture further comprises:
  a second proportion of fats and a second proportion of proteins proportional to the second proportion of fats;
  a first proportion of acid configured to promote micelle formation within the second subvolume.

20. The base mixture of claim 19, wherein the base mixture further comprises a third subvolume:
comprising a second proportion of acid greater than the first proportion of acid and configured to lower a pH level of the third subvolume; and
configured to form a non-dairy yogurt product.

* * * * *